(12) United States Patent
Medin et al.

(10) Patent No.: US 8,270,055 B2
(45) Date of Patent: Sep. 18, 2012

(54) MODIFIED ELECTRODE SIGNAL DURING RESET OF A MICRO-MIRROR DISPLAY DEVICE

(75) Inventors: David L. Medin, Los Altos, CA (US); Tore Nauta, Los Gatos, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 289 days.

(21) Appl. No.: 12/760,465

(22) Filed: Apr. 14, 2010

(65) Prior Publication Data

US 2011/0255140 A1 Oct. 20, 2011

(51) Int. Cl.
*G02B 26/08* (2006.01)
(52) U.S. Cl. .................................. 359/223.1
(58) Field of Classification Search ............... 359/196.1, 359/197.1, 212.1–214.1, 223.1–226.1, 290, 359/291
See application file for complete search history.

(56) References Cited

U.S. PATENT DOCUMENTS 7,408,688 B2 * 8/2008 Katoh et al. ............... 359/197.1

OTHER PUBLICATIONS

Van Kessel, Peter F., Hornbeck, Larry J., Meier, Robert E., and Douglas, Michael R., "A MEMS-Based Projection Display," Proceedings of the IEEE, vol. 86, No. 8, Aug. 1998, 18 pages.
Knipe, R.L. (1996). "Challenges of a Digital Micromirror Device™: Modeling and Design," SPIE EurOpto Proceedings, 2783:135-145.

* cited by examiner

*Primary Examiner* — Euncha Cherry
(74) *Attorney, Agent, or Firm* — Fish & Richardson P.C.

(57) ABSTRACT

Methods, systems, and apparatus for resetting a micro-mirror devices. In one aspect, a micro-mirror device includes a mirror plate tiltable about a hinge, two electrodes located on different sides of the hinge, a memory storing state data for the electrodes, and a state modifier operable to receive the state data for the electrodes from the memory and, during a reset of the mirror plate, change the state for at least one of the electrodes from the state specified by the state data stored in memory to a different state.

24 Claims, 20 Drawing Sheets

__US 8,270,055 B2__

MODIFIED ELECTRODE SIGNAL DURING RESET OF A MICRO-MIRROR DISPLAY DEVICE

BACKGROUND

This specification relates to micro-mirror display devices.

Micro-mirror display devices are commonly used in projection displays. These projection displays project light corresponding to color channels of the image. A micro-mirror display device displays the pixels of an image by tilting mirror plates to project light (to display the pixel) or to deflect light (to not display the pixel). The amount of time that the mirror plates are turned on and off controls the intensity for a given pixel and a given color.

The mirror plates are tilted using digital control signals derived from bit plane data for the image. Electrical signals corresponding to the digital control signals for each mirror plate are provided to two electrodes placed on opposite sides of a hinge for the mirror plate. A voltage is applied to the mirror plate, and electrostatic force attraction causes the mirror plate to tilt in one direction or another, depending on the voltage provided to the electrodes. At appropriate times, the micro-mirror display device resets the mirror plates by modifying the voltage applied to the mirror plate. This reset causes the mirror plate to change into a new state, or stay in its current state, as appropriate.

In order to overcome the electrostatic forces on the mirror plate, and thus guarantee a proper mirror plate reset, many micro-mirror display devices use a bipolar reset signal. The bipolar reset signal temporarily applies a negative voltage to the mirror plate during reset. However, a bipolar reset signal can have several problems. For example, the positive and negative power supplies required to generate a bipolar reset signal can be more expensive than positive-only power supplies and generating a negative voltage require more power than generating a non-negative voltage.

SUMMARY

This specification describes technologies relating to resetting the mirror plates in a micro-mirror display device.

In general, one innovative aspect of the subject matter described in this specification can be embodied in a micro-mirror device that includes a mirror plate tiltable about a hinge; two electrodes located on different sides of the hinge; a memory storing state data for the electrodes; a state modifier operable to receive the state data for the electrodes from the memory and, during a reset of the mirror plate, change the state for at least one of the electrodes from the state specified by the state data stored in memory to a different state.

These and other embodiments can each optionally include one or more of the following features. Changing the state for at least one of the electrodes can include changing the state of the at least one electrode from a high state to a low state. The high state can correspond to a higher voltage than the low state. The state data can specify a state of the mirror, from which the state of the electrodes can be derived. The state modifier can be a single state modifier operable to receive the state data for the mirror and modify the received state data; and the device can further include an electrode state determiner operable to receive the modified state data for the mirror and determine an appropriate state for one of the electrodes from the modified state data. The state modifier can comprise a separate state modifier for each electrode. The state modifier can implement an exclusive-or function. The state modifier can generate a same state for both of the electrodes. The same state can be a low state.

The device can further include an amplifier configured to provide power to the electrodes according to the states of the electrodes. The device can further include a reset manager operable to provide a reset signal to the mirror plate during the reset of the mirror plate. Each electrode can receive a voltage corresponding to the state of the electrode, and the reset signal can be a unipolar signal. The reset signal can have an oscillating voltage. The reset manager can be further operable to provide a reset signal to additional mirror plates that are electrically connected to the mirror plate.

In general, another aspect of the subject matter described in this specification can be embodied in a method that includes the actions of storing state data for the mirror on a computer-readable medium, the state data indicating a state for two electrodes associated with the mirror; and in response to a reset request: retrieving the state data; changing the state of at least one of the electrodes from a state indicated by the state data to a different state; and sending a reset signal to the mirror. Other embodiments of this aspect include corresponding systems, apparatus, and computer programs recorded on computer storage devices, each configured to perform the operations of the methods.

These and other embodiments can each optionally include one or more of the following features. Changing the state for at least one of the electrodes can include changing the state of the at least one electrode from a high state to a low state. The high state can correspond to a higher voltage than the low state. The state data can specify a state of the mirror, the method further comprising deriving the state of the electrodes from the state of the mirror. Changing the state of at least one of the electrodes can include causing both of the electrodes to have a same state. The same state can be a low state.

The method can further include providing power to each electrode with a voltage corresponding to the state of the electrode, wherein the reset signal is a unipolar signal. The reset signal can have an oscillating voltage. The method can further include providing a reset signal to additional mirror plates that are electrically connected to the mirror plate.

Particular embodiments of the subject matter described in this specification can be implemented so as to realize one or more of the following advantages. A unipolar reset signal can be used to effectively reset a micro-mirror device. This can result in cheaper micro-mirror display systems, as problems traditionally associated with the negative voltage of a bipolar reset signal can be avoided. Reset circuitry can be easily incorporated with other semiconductor circuits. This can lead to micro-mirror devices with lower cost, smaller form factor, and smaller power requirements than conventional micro-mirror devices.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
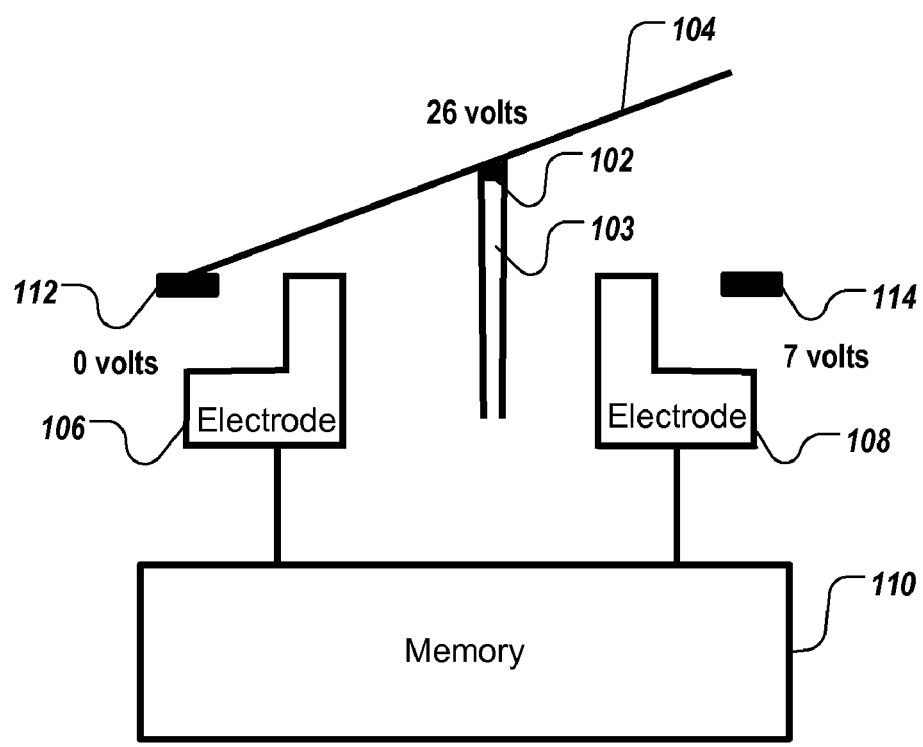
FIG. 1 is a block diagram of an example micro-mirror.

FIG. 1 is a block diagram of an example of a single micro-mirror of a micro-mirror display device, e.g., a Spatial Light Modulator. The micro-mirror includes a hinge 102 on a post 103, a mirror plate 104, two electrodes: a left electrode 106 and a right electrode 108, and two springs: left spring 112 and right spring 114.

Each electrode has a state, which is determined from data stored in memory 110. The memory can store a separate state for each electrode or alternatively, can store a single state for the mirror plate from which the state of each electrode can be derived. In some implementations, the memory 110 stores only state(s) for the mirror plate and/or electrodes for one point in time. In other implementations, the memory 110 can store states corresponding to multiple points in time. When the memory 110 stores state(s) for multiple points in time, the state of the electrode is determined from data corresponding to the current time.

In general, each electrode can be either in a high state or a low state. An electric signal is applied to each electrode in accordance with the electrode's state. The high state corresponds to a higher voltage than the low state.

The state of the mirror plate 104 corresponds to a signal applied to the mirror plate and the state of the electrodes 106 and 108. The mirror plate 104 starts in a first position, determined by the signal applied to the mirror and the state of the electrodes 106 and 108. In general, the mirror plate 104 is tilted toward the electrode 106 or 108 whose voltage potential difference with the mirror plate is the greatest. A signal can be applied to the mirror plate, for example, by applying a signal to the post 103 which is conductively coupled to the hinge 102 and the mirror 104, allowing the signal to pass from the post 103 through the hinge 102 to the mirror 104.

For example, in FIG. 1, the left electrode 106 has a voltage of 0 volts (corresponding to a low state), the right electrode has a voltage of 7 volts (corresponding to a high state), and the mirror plate 104 has a voltage of 26 volts. The voltage potential difference between the mirror plate and the electrodes controls the tilt of the mirror plate. The voltage potential difference between the left electrode 106 and the mirror plate 104 is 26 volts (i.e., 26 volts minus 0 volts), and the voltage potential difference between the right electrode 108 and the mirror plate 104 is 19 volts (i.e., 26 volts minus 7 volts). Because the left electrode 106 has a higher voltage, the mirror plate 104 is tilted left toward the left electrode 106.

The states of the mirror plates in a micro-mirror display device are updated frequently to display the image being projected. With each update, some mirrors can have their states changed from one state to another, e.g., in a crossover operation, and some mirrors can have their states remain in the same state, e.g., in a stay operation.

When the state of the mirror plate needs to be changed, e.g., in a crossover operation, new values for the states of the electrodes 106 and 108 are loaded from memory 110, and voltages corresponding to the new states are applied to the respective electrodes. However, the electrostatic forces that pull the mirror plate 104 toward one electrode or the other are not based purely on voltage potential difference, but are also inversely proportional to the square of the distance between the edge of the mirror and the electrode. Thus, merely loading a new state for the electrodes into memory (and applying the corresponding voltage) is not always sufficient to cause the mirror plate 104 to crossover as desired.

Therefore, many micro-mirror display systems use a reset signal to help release the mirror plate 104 and allow the mirror plate to crossover when appropriate (and stay, when appropriate). The reset signal changes the voltage on the mirror plate 104, thus changing the force that the mirror plate 104 exerts on a spring (e.g., left spring 112 or right spring 114, depending on the state of the mirror). When the reset signal ends, the spring exerts a force on the mirror plate 104, causing the mirror plate 104 to reset.

Conventional micro-mirror displays reset the mirror plate 104 by changing the voltage applied to the mirror plate in response to a reset signal. For example, a conventional micro-mirror display can use a bipolar reset signal to temporarily apply a negative voltage to the mirror plate 104. This increases the downward electrostatic force that the mirror plate 104 exerts on a spring during a crossover operation. For example, in FIG. 1, the mirror plate 104 would be reset by causing a downward force on the left spring 112. When the reset signal ends, and the negative voltage is no longer applied, the spring 112 exerts a force on the mirror plate 104 corresponding to the force the mirror plate 104 exerted on the spring 112. The force from the spring 112 causes the mirror plate 104 to release. During a stay operation, the negative voltage causes less downward electrostatic force than the force created during a crossover operation, and sometimes less force than was exerted on the spring before the stay operation. The difference in forces exerted during a stay operation and a crossover operation causes the mirror plate 104 move into the correct position after the reset has ended. However, the use of negative voltage during a bipolar reset can have several drawbacks, some of which are described above.

An alternative technique for resetting the mirror plate 104 is to modify the states of the electrodes 106 and 108 while applying a reset signal to the mirror plate 104. This creates the same differences in force on the spring for a crossover operation than for a stay operation, but without the drawbacks of using negative voltage. Example processes and devices for this modified electrode signal reset are described in more detail below.

FIGS. 2A-2E illustrate an example crossover reset of a micro-mirror using a modified electrode signal. The micro-mirror includes a hinge 102, a mirror plate 104, two electrodes: a left electrode 106 and a right electrode 108, and two springs: a left spring 112 and a right spring 114. For illustrative purposes, specific voltages are shown in FIGS. 2A-2E; however, other voltages can also be used.

Figure 2A:
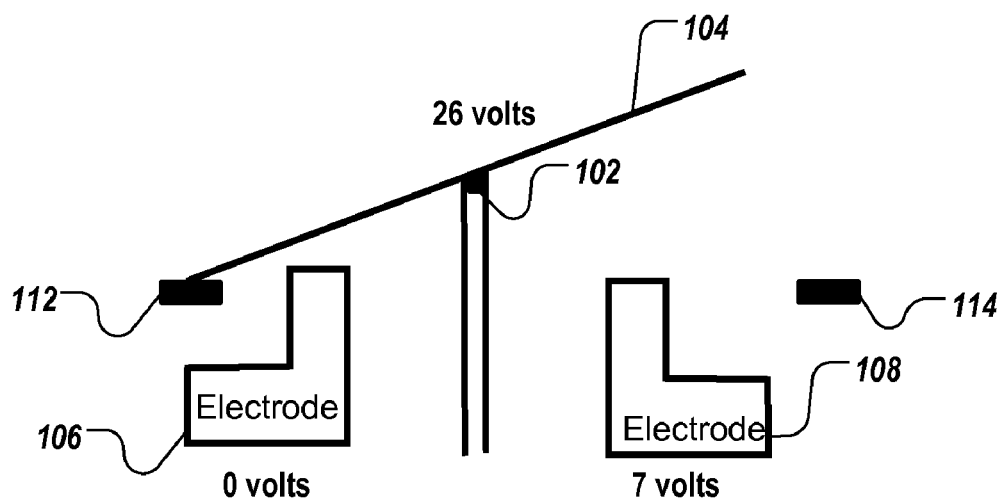
FIGS. 2A-2E illustrate an example crossover reset of a micro-mirror using a modified electrode signal.

FIG. 2A illustrates an initial state of the micro-mirror. The left electrode is in a low state (with a corresponding voltage of 0 volts) and the right electrode is in a high state (with a corresponding voltage of 7 volts). The voltage potential differences for the left and right electrodes cause the mirror plate 104 to tilt toward the left electrode 106.

Figure 2B:
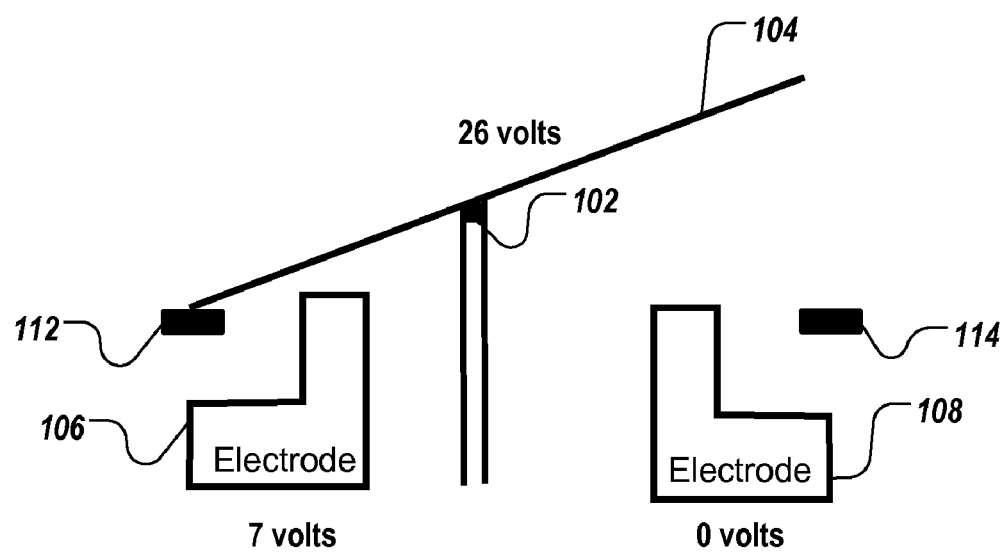

FIG. 2B illustrates a second state of the micro-mirror, after the states of the electrodes have been updated to reflect data stored in memory but before a reset signal has been applied to the mirror plate. The left electrode is in a high state (with a corresponding voltage of 7 volts) and the right electrode is in a low state (with a corresponding voltage of 0 volts). However, the mirror plate 104 does not tilt right because the electrostatic force exerted by the right electrode 108 is not strong enough to move the mirror plate 104.

Figure 2C:
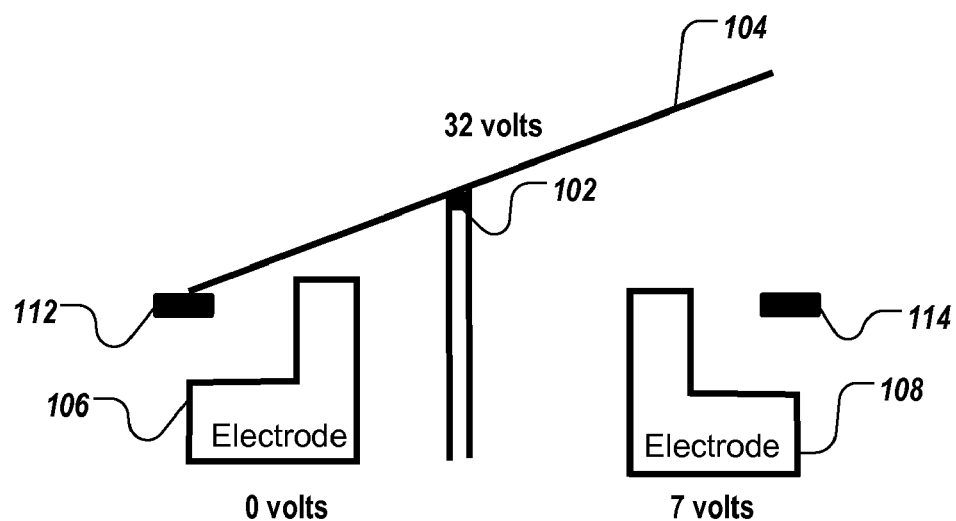

FIG. 2C illustrates the beginning of a reset of the micro-mirror. The states of the electrodes are temporarily modified. Left electrode 106 is changed from a high state to a low state (with corresponding voltage of 0 volts) and right electrode 108 is changed from a low state to a high state (with a corresponding voltage of 7 volts). At approximately the same time, a reset signal with a positive voltage of 32 volts is sent to the mirror plate. This increases the downward force on the left spring 112.

Figure 2D:
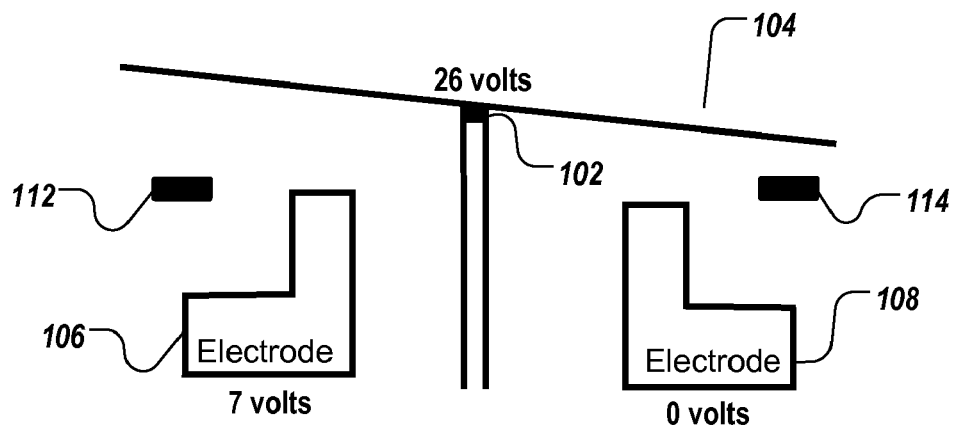

FIG. 2D illustrates the micro-mirror after the reset signal has ended, and while the mirror plate 104 is moving to its final state. The voltage on the mirror plate 104 is decreased to its pre-reset level of 26 volts, and the voltage to the electrodes is returned to their pre-reset values, e.g., left electrode 106 is again in a high state and right electrode 108 is again in a low state. The force from the left spring 112 has caused the mirror plate 104 to move into a reset state. For illustrative purposes, the reset state 104 is shown as being a state where the mirror moves past the horizontal state, e.g., closer to right electrode 108 than left electrode 106; however, other reset states can be used. For example, the mirror plate 104 could stop at the horizontal state during reset.

Figure 2E:
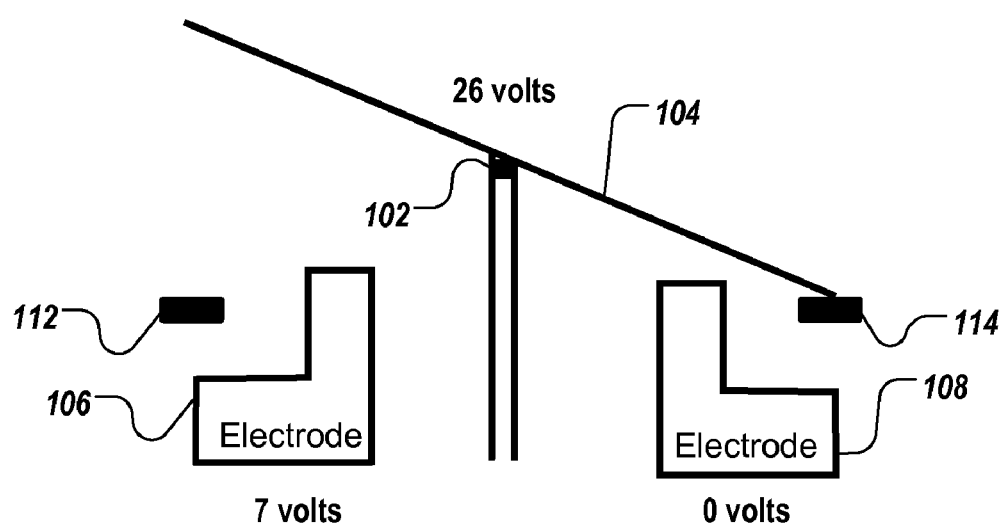

FIG. 2E illustrates a final state of the micro-mirror, after the state of the mirror plate 104 has been updated. Left electrode 106 is in a high state, as indicated by data stored in memory, and right electrode 108 is in a low state, as indicated by data stored in memory. The mirror plate 104 is tilted to the right, which is the correct state for the mirror plate 104 given the state of the two electrodes 106 and 108.

FIGS. 3A-3E illustrate an example stay reset of a micro-mirror using a modified electrode signal. The micro-mirror includes a hinge 102, a mirror plate 104, two electrodes: a left electrode 106 and a right electrode 108, and two springs: a left spring 112 and a right spring 114. For illustrative purposes, specific voltages are shown in FIGS. 3A-3E; however, other voltages can also be used.

Figure 3A:
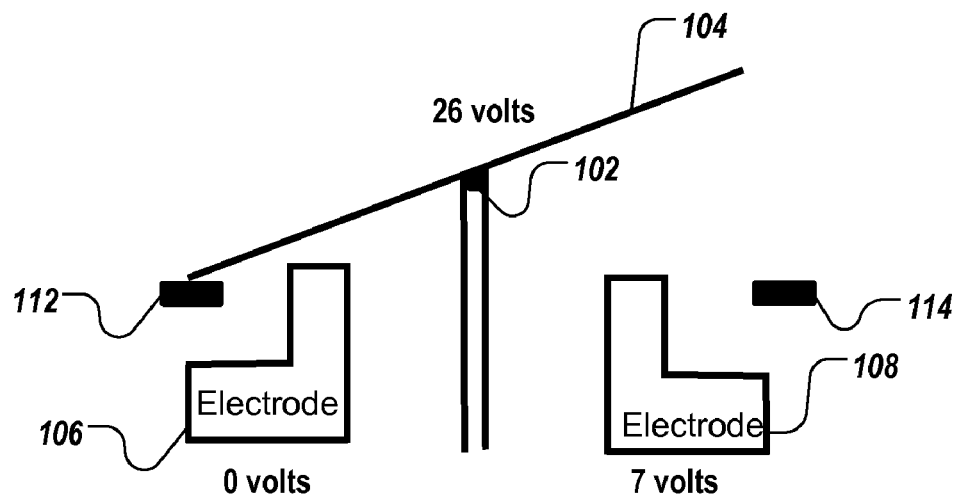
FIGS. 3A-3E illustrate an example stay reset of a micro-mirror using a modified electrode signal.

FIG. 3A illustrates an initial state of the micro-mirror. The left electrode is in a low state (with a corresponding voltage of 0 volts) and the right electrode is in a high state (with a corresponding voltage of 7 volts). The voltage potential differences for the left and right electrodes cause the mirror plate 104 to tilt toward the left electrode 106.

Figure 3B:
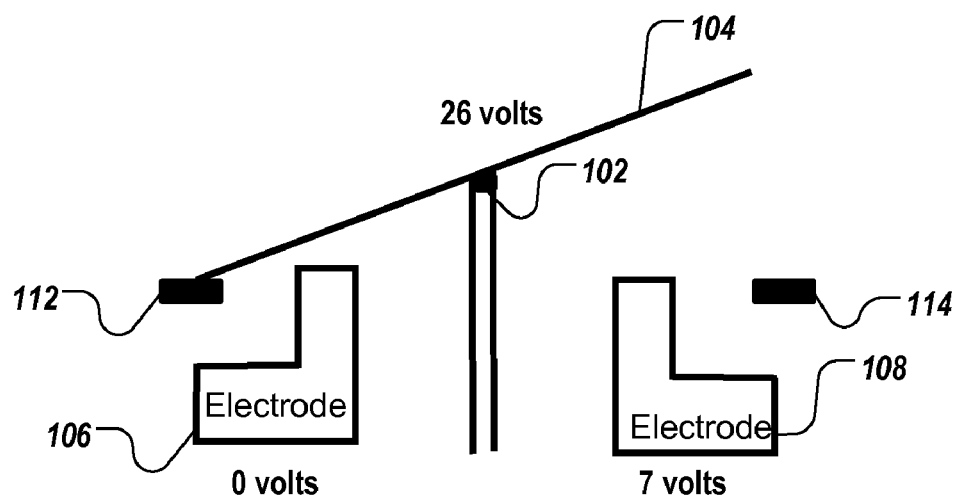

FIG. 3B illustrates a second state of the micro-mirror, after the state of the electrodes has been updated to reflect data stored in memory but before a reset signal has been applied to the mirror plate. The left electrode remains in a low state (with a corresponding voltage of 0 volts), and the right electrode remains in a high state (with a corresponding voltage of 7 volts).

Figure 3C:
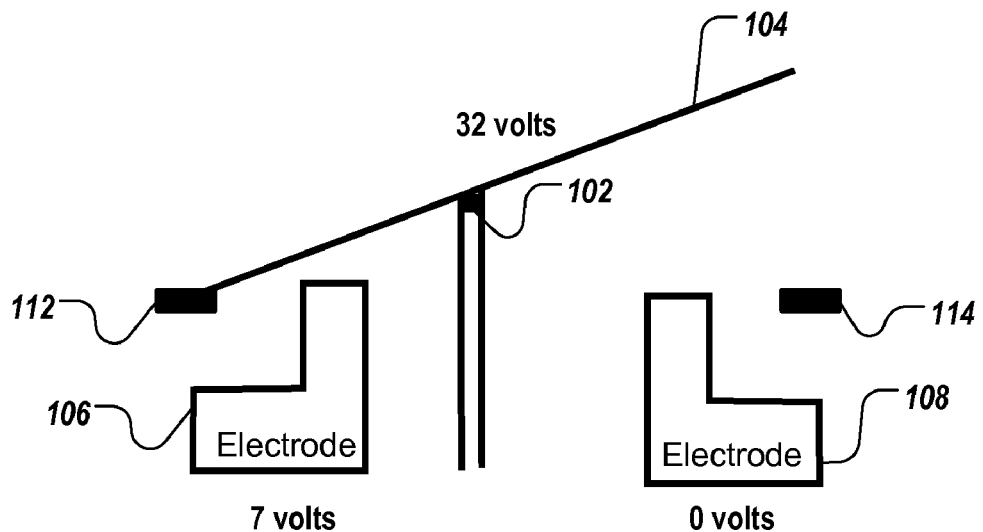

FIG. 3C illustrates the beginning of a reset of the micro-mirror. The states of the electrodes are temporarily modified. Left electrode 106 is changed from a low state to a high state (with corresponding voltage of 7 volts) and right electrode 108 is changed from a high state to a low state (with a corresponding voltage of 0 volts). At approximately the same time, a reset signal (32 volts) is sent to the mirror plate. This changes the downward force on the left spring 112, causing the force to be less than it was before the reset began.

Figure 3D:
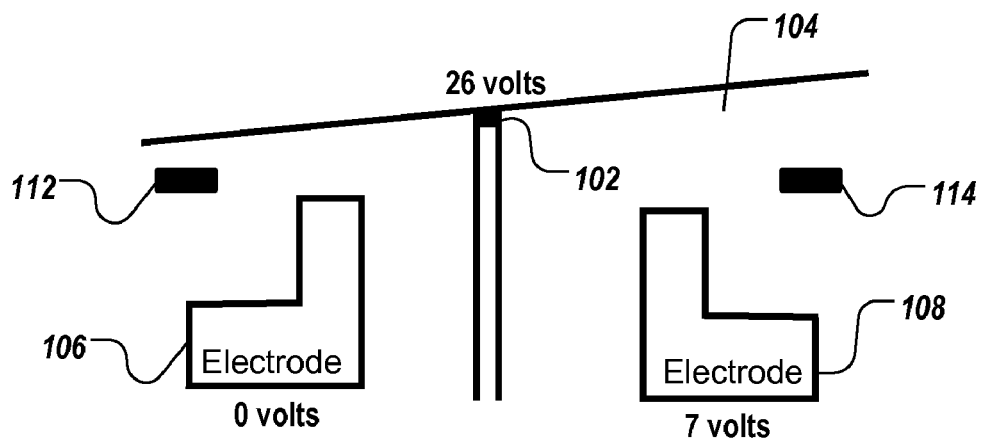

FIG. 3D illustrates the micro-mirror after the reset has ended, and while the mirror plate 104 is moving to its final state. The voltage on the mirror is decreased to its pre-reset level of 26 volts, and the voltage to the electrodes is returned to the pre-reset values. The mirror plate 104 has moved into a reset state. For illustrative purposes, the reset state 104 is shown as being a state where the mirror stops short of a horizontal state, e.g., closer to the left electrode 106 than the right electrode 108; however, other reset states can be used. For example, the mirror plate 104 could move into a horizontal state.

Figure 3E:
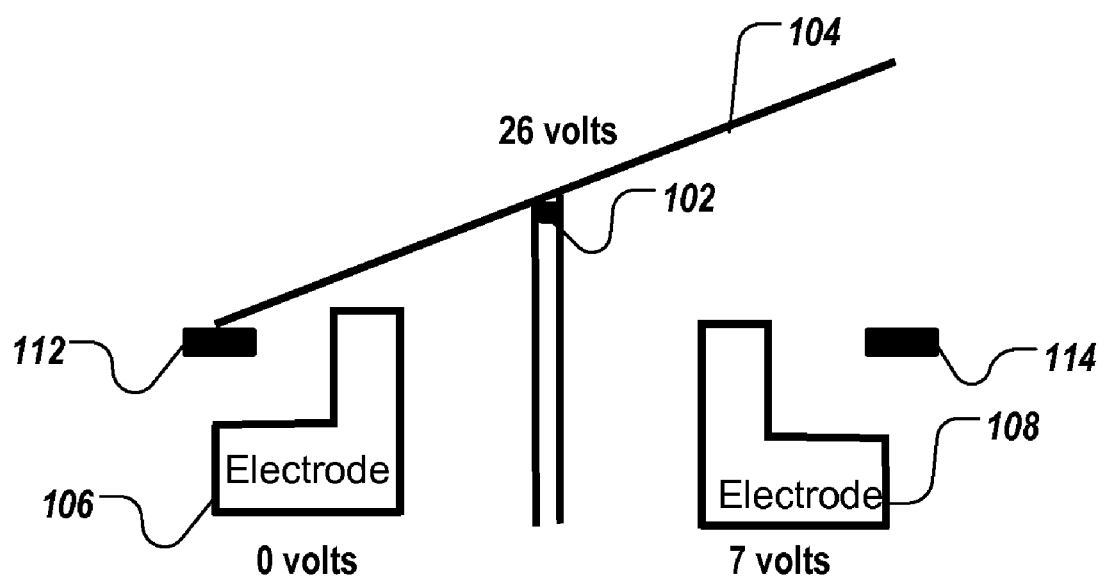

FIG. 3E illustrates a final state of the micro-mirror, after the state of the mirror plate has been updated. The mirror plate 104 is tilted to the left, which is the correct state for the mirror plate 104 given the state of the two electrodes 106 and 108.

The mirror resets described above with reference to FIGS. 2 and 3 can be implemented in various types of micro-mirror systems. For illustrative purposes, two example systems are described below with reference to FIGS. 4 and 5.

Figure 4:
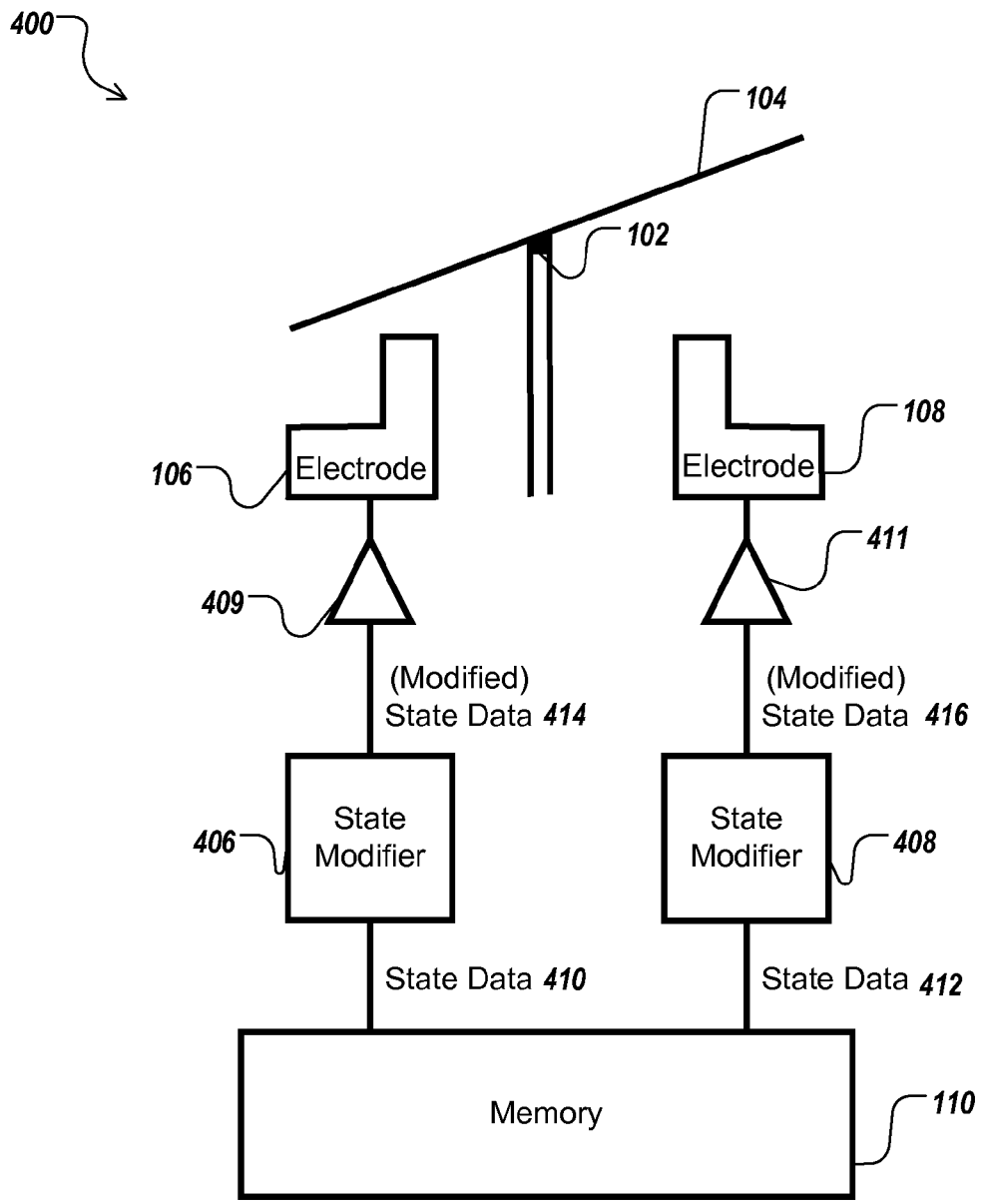
FIG. 4 illustrates an example system operable to change the state of both electrodes for a mirror plate during a modified electrode signal reset of the mirror plate.

FIG. 4 illustrates an example system 400 operable to change the state of both electrodes for a mirror plate 104 during a modified electrode signal reset of the mirror plate.

The system 400 includes a hinge 102, a mirror plate 104, a left electrode 106, and a right electrode 108. The system 400 also includes a memory 110 that stores a state for each electrode, state modifiers 406 and 408, and amplifiers 409 and 411. The system 400 can also include a spring corresponding to each electrode.

During normal (non-reset) operation of system 400, state data 410 for the left electrode 106 and state data 412 for the right electrode 108 are retrieved from memory 110 and passed through the state modifiers 406 and 408, respectively, to the left amplifier 409 and the right amplifier 411 without modification. The amplifiers 409 and 411 provide voltages to the left electrode 106 and the right electrode 108, respectively, appropriate to the state of each of the electrodes.

During a reset operation of system 400, when state data 410 and 412 are received by state modifiers 406 and 408, the state modifiers change the state of the data, resulting in modified state data 414 and 416. For example, if state data 410 indicates a high state for left electrode 106, state modifier 406 can generate modified state data 414 indicating a low state for left electrode 106. Similarly, if state data 410 indicates a low state for left electrode 106, state modifier 406 can generate modified state data 414 indicating a high state for left electrode 106.

The reset operation of a system refers to a period of time during which the mirror is being reset. This time can include the time during which a reset signal is being applied to the mirror, as well as a period of time before or after the reset signal is applied to the mirror, during which preparation for the reset occurs. For example, during a reset operation, the states of the electrodes can be modified, then after some period of time a reset signal can be applied to the mirror.

State modifiers 406 and 408 can be various components operable to modify the state data when appropriate. For example, state modifiers 406 and 408 can each be an xor gate (or other component or combination of components that provides exclusive-or functionality) that receives the state data as well as a control signal that indicates whether a reset is being performed. The state data can be, for example, 0 when the electrode is in a low state and 1 when the electrode is in a high state. The control signal can be, for example, 0 during normal operation and 1 during a reset operation.

Figure 5:
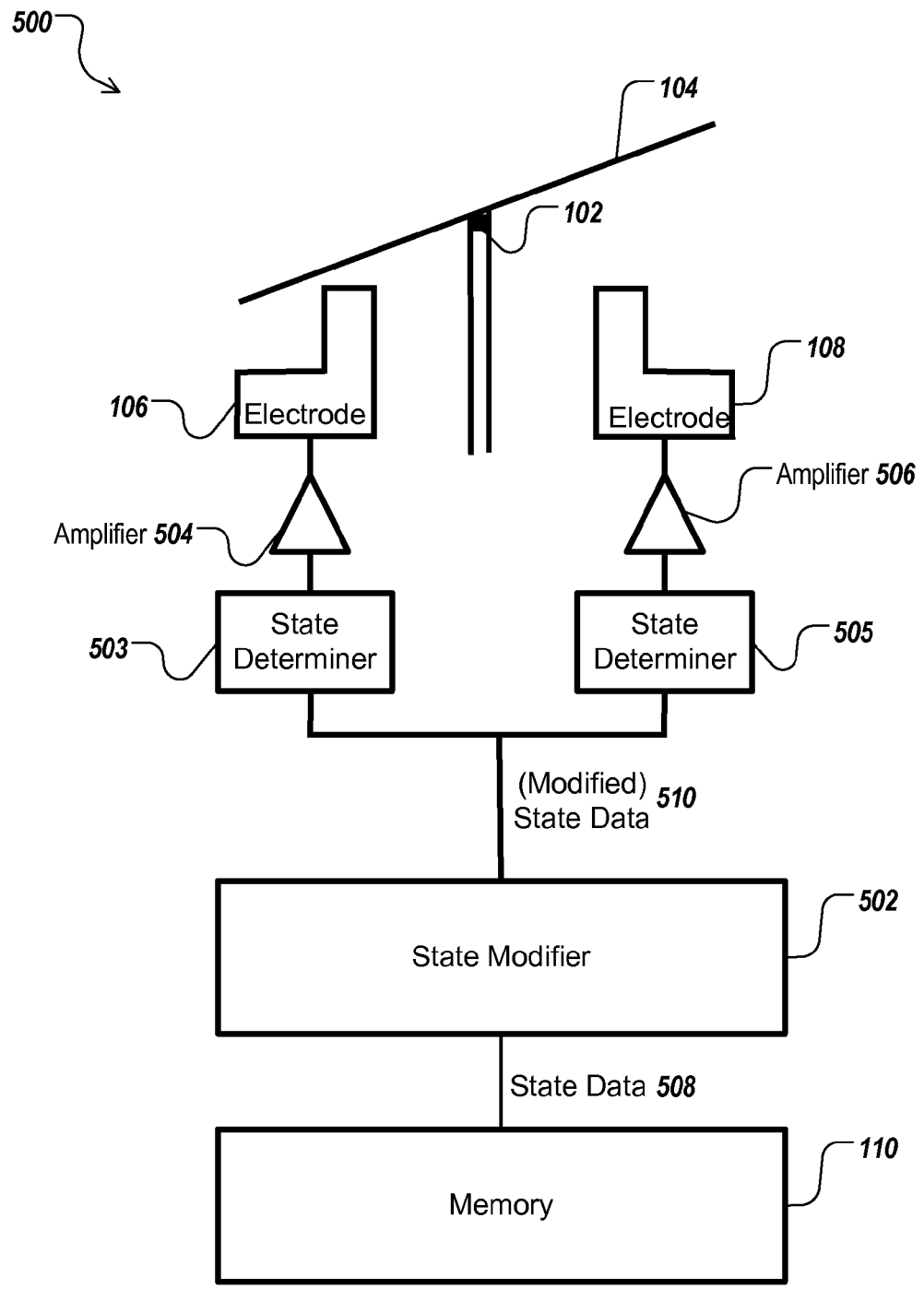
FIG. 5 illustrates an example system operable to change the state of a mirror plate during a modified electrode reset signal of the mirror plate and therefore change the state of the electrodes for the mirror plate.

FIG. 5 illustrates an example system 500 operable to change the state of a mirror plate 104 during a modified electrode reset signal of the mirror plate, and therefore change the state of the electrodes 106 and 108 for the mirror plate 104.

The system 500 includes a hinge 102, a mirror plate 104, a left electrode 106, and a right electrode 108. The system 500 also includes a memory 110 that stores a state for the mirror plate 104, a state modifier 502 that modifies the state of the mirror plate, state determiners 503 and 505 that determine an appropriate state for each electrode, and amplifiers 504 and 506 that provide electrical signals to the left electrode 106 and right electrode 108. State modifier 502 can be, for example, an xor gate. The system 500 can also include a spring corresponding to each electrode.

During normal (non-reset) operation of system 500, state data 508 for the mirror plate 104 is retrieved from the memory 110 and passed through the state modifier 502 to the state determiners 503 and 505 without modification. The state determiners 503 and 505 determine the appropriate state for each respective electrode. For example, each state determiner can be an xor gate (or other component or combination of components that provides exclusive-or functionality). The control signal for one electrode can be 1 and the control signal for the other electrode can be 0, thus causing one electrode to have the same state as the mirror, and the other electrode to have a state that is the opposite of the state of the mirror. The amplifiers 504 and 506 then provide correct voltages for each electrode state to the electrodes.

However, during reset operation of system 500, when state data 508 is received by the state modifier 502, the state modifier 502 changes the state of the data, resulting in modified state data 510. For example, if state data 508 indicates that the mirror plate 104 should be off, the state modifier 502 can generate modified state data 510 indicating that the mirror plate 104 should be on. Similarly, if state data 508 indicates that the mirror plate 104 should be on, the state modifier 502 can generate modified state data 510 indicating that the mirror plate should be off. This modified state data 510 is then provided to state determiners 503 and 505. The state determiners 503 and 505 can then determine appropriate states for electrodes 106 and 108 from the modified state data 510.

While FIGS. 4 and 5 illustrate two ways that a state modifier can be used, other state modifiers can also be used. For example, a state modifier can read the state data from the memory 110, change the state of the state data, and re-write the modified state data to the memory. The modified state data stored in the memory 110 can then be used to determine the appropriate states for the electrodes.

Figure 6A:
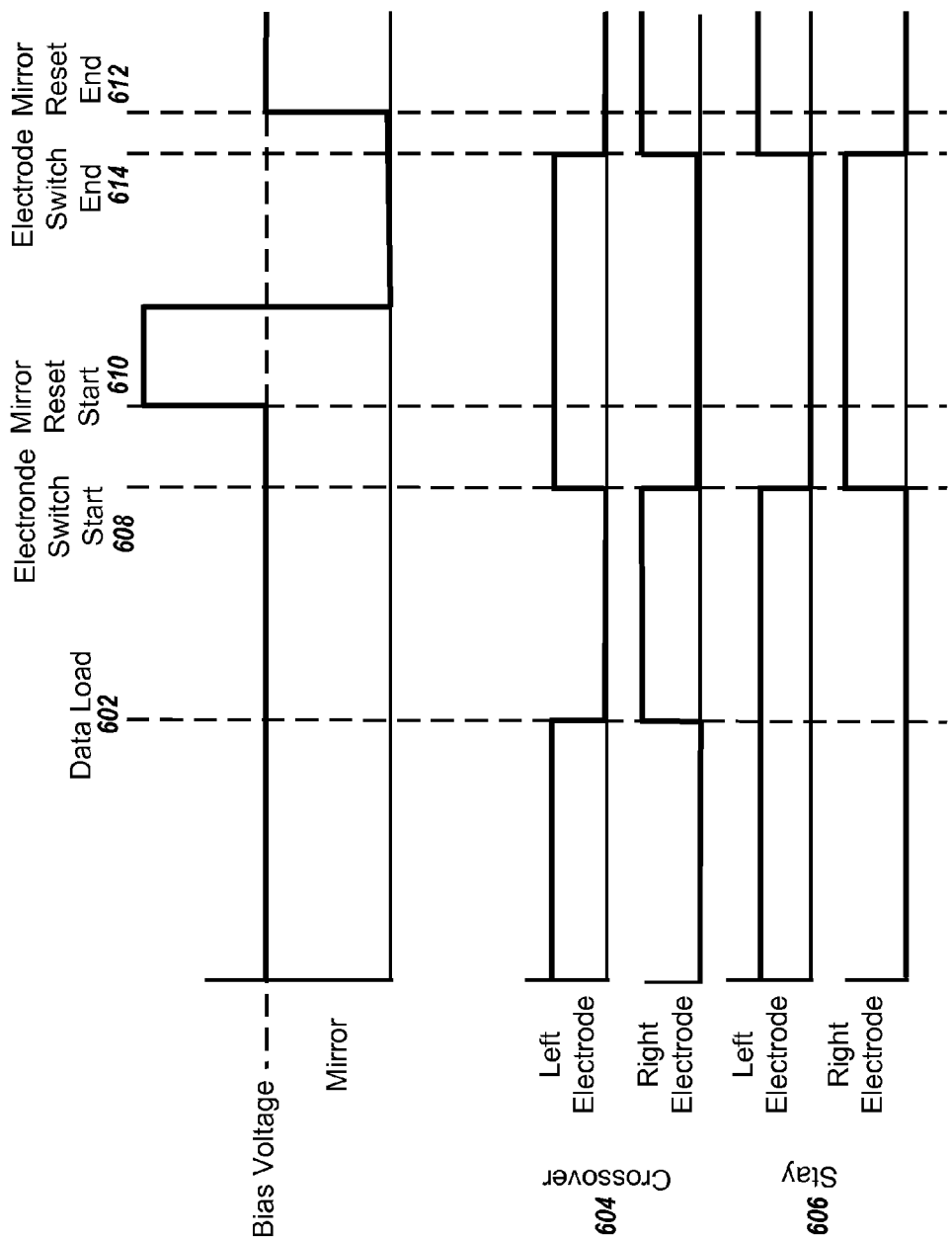
FIGS. 6A-6C illustrate example waveforms for voltages applied to a mirror plate, left electrode, and right electrode during crossover and stay reset operations.
Figure 6B:
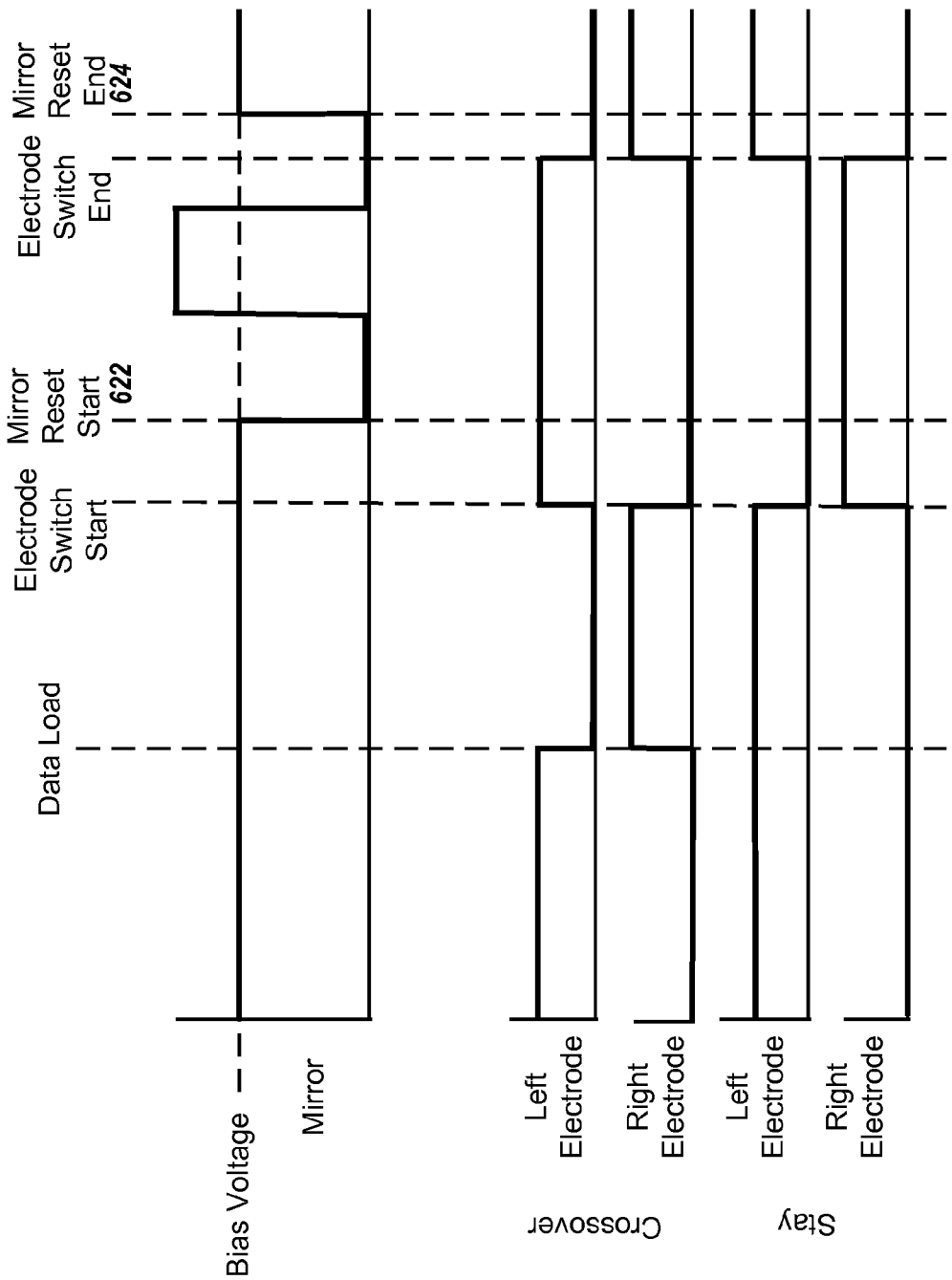
Figure 6C:
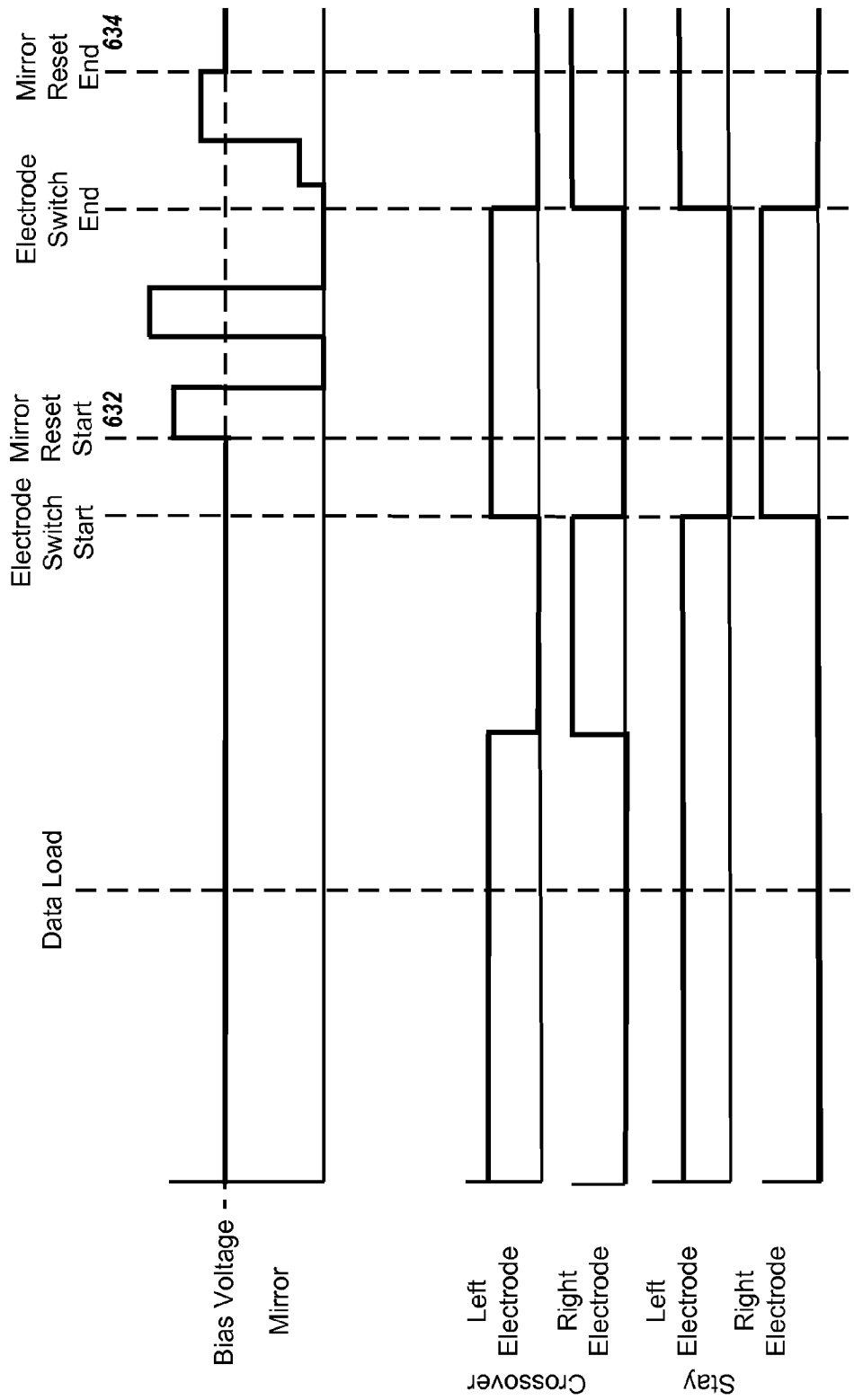

FIGS. 6A-6C illustrate example waveforms for voltages applied to a mirror plate, left electrode, and right electrode during crossover and stay reset operations.

In the example illustrated in FIG. 6A, new data indicating the state of the mirror is loaded at time 602. During a crossover operation 604, this causes the voltage applied to the left electrode to change from a high voltage to a low voltage, and the voltage applied to the right electrode to change from a low voltage to a high voltage. During a stay operation, this causes the voltage on the left electrode and the right electrode to stay the same.

At time 608, the states of the electrodes are switched. Thus, during a crossover operation, high voltage is applied to the left electrode and low voltage is applied to the right electrode, and during a stay operation, low voltage is applied to the left electrode and high voltage is applied to the right electrode.

From time 602 to time 610, the voltage on the mirror stays constant (e.g., at the bias voltage). The bias voltage is the voltage applied to the mirror after a reset to keep the mirror in a particular state. At time 610, the mirror reset begins. During the mirror reset, the voltage on the mirror is first increased above the bias voltage, and then decreased to zero where it remains until the mirror reset ends at time 612 and the voltage returns to the bias voltage level. Just before time 612, at time 614, the states of the electrodes are returned to their original states.

In the example illustrated in FIG. 6B, voltage is applied to the mirror plate according to a different waveform than the waveform illustrated in FIG. 6A. The voltage waveform illustrated in FIG. 6B goes to zero when the mirror reset starts at time 622, then to a voltage level above the bias voltage on the mirror, and then back to zero until the mirror reset ends at time 624. The voltages applied to the left and right electrode are the same as illustrated in FIG. 6A.

In the example illustrated in FIG. 6C, voltage is applied to the mirror plate according to a still different voltage waveform used during the mirror reset. When the mirror reset begins at time 632, the voltage illustrated in FIG. 6C increases above the bias voltage, then decreases to zero, then increases above the bias voltage and returns to zero, then steps to a voltage greater than zero but less than the bias voltage, and then returns to a level above the bias voltage before returning to the bias voltage at the end of the mirror reset at time 634. The voltages applied to the left and right electrodes are the same as illustrated in FIG. 6A.

The examples illustrated in FIGS. 6A-6C are provided to illustrate just a few of the many possible waveforms that can be used during reset. Other waveforms and different voltage levels within the waveforms can also be used. Other timings can also be used. For example, the mirror reset start can occur before, or at the same time as, the electrode switch start. Similarly, the mirror reset end can occur before, or at the same time as, the electrode switch end. As another example, the timing of the voltage changes on the mirror during reset can also be modified.

The timing and the levels of voltage changes can be determined according to a number of factors including, for example, the size of the mirror plate, the distance between the mirror plate and the electrodes, the material that the hinge is made out of, the thickness of the hinge, the width of the hinge, and any anneal conditions of the hinge, e.g., any change in elevated temperature over time to which the hinge is exposed. The appropriate bias voltage level can be derived, for example, from the voltage required to move the mirror to either the left or the right when the mirror is in a flat state. For example, the bias voltage can be derived by adding a constant voltage level to the voltage required to move the mirror to either the left or the right when the mirror is in a flat state.

FIGS. 7A-7E illustrate another example crossover reset of a micro-mirror using a modified electrode signal. The reset illustrated in FIGS. 7A-7D differs from the reset described above with reference to FIGS. 2-6, because unlike the examples illustrated in FIGS. 2-6, in FIGS. 7A-7E, the state of only one electrode is modified. This results in the two electrodes having the same state. Specifically, in the example illustrated in FIGS. 7A-7E, the electrode in a high state is changed to a low state, while the electrode in a low state is left unchanged. However, in alternative implementations, the electrode in the low state is changed to a high state, and the electrode in the high state is left unchanged. In comparison to the two-state modification described above with reference to FIGS. 2-8, the one-state modification reset described in FIGS. 7A-7E exerts more similar forces during a cross-over and stay reset operation.

The micro-mirror includes a hinge 102, a mirror plate 104, and two electrodes: a left electrode 106 and a right electrode 108. For illustrative purposes, specific voltages are shown in FIG. 6; however, other voltages can also be used.

Figure 7A:
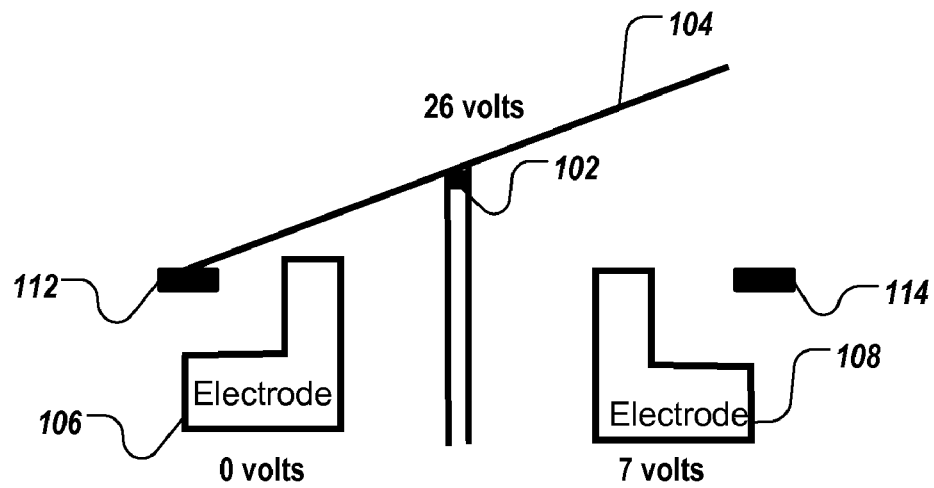
FIGS. 7A-7E illustrate another example crossover reset of a micro-mirror using a modified electrode signal.

FIG. 7A illustrates an initial state of the micro-mirror, before the state of the mirror plate is updated. The left electrode 106 is in a low state (with a corresponding voltage of 0 volts) and the right electrode 108 is in a high state (with a corresponding voltage of 7 volts). The voltage potential differences for the left and right electrodes cause the mirror plate 104 to tilt left.

Figure 7B:
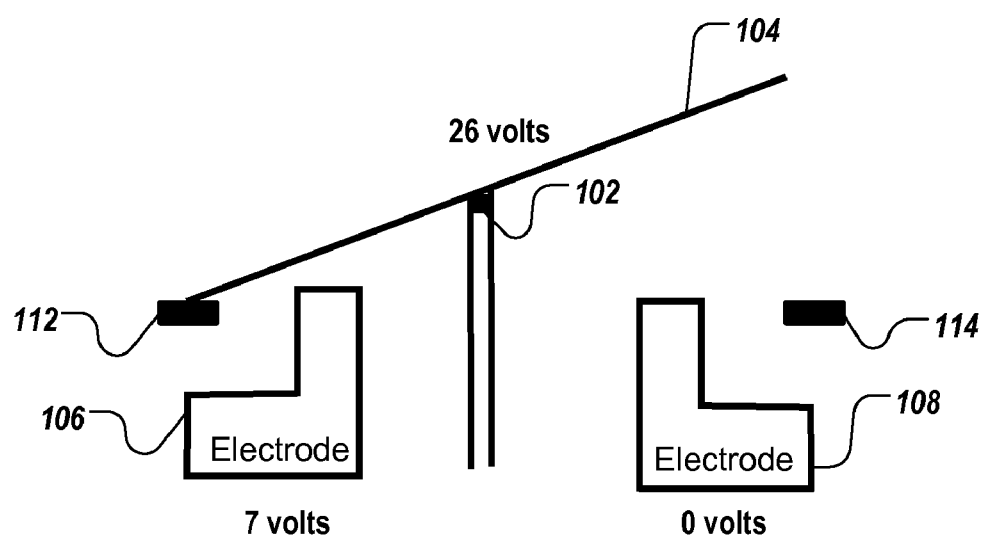

FIG. 7B illustrates a second state of the micro-mirror, after the state of the electrodes have been updated to reflect data stored in memory, but before a reset signal has been applied to the mirror plate. The left electrode 106 is in a high state (with a corresponding voltage of 7 volts) and the right electrode 108 is in a low state (with a corresponding voltage of 0 volts). However, the mirror plate 104 does not tilt right because the change in voltage potential differences is not sufficient to overcome the difference in the distance between the left electrode 106 and the mirror plate 104 and the distance between the right electrode 108 and the mirror plate 104.

Figure 7C:
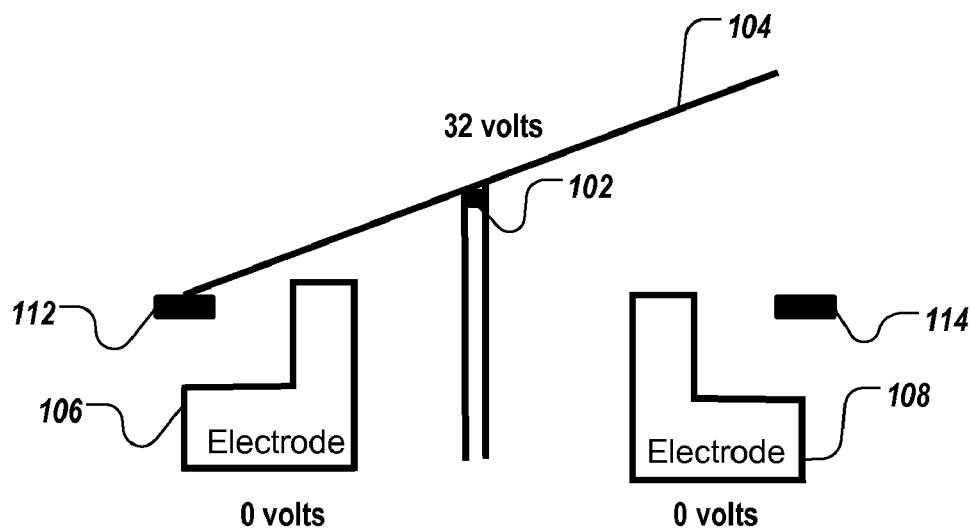

FIG. 7C illustrates a beginning of a reset of the micro-mirror. Left electrode 106 is changed from a high state to a low state (with a corresponding voltage of 0 volts). This change can be made, for example, by turning off the voltages to both of the electrodes 106 and 108. The state of right electrode 108 is left unchanged. At approximately the same time, a reset signal is sent to the mirror plate 104, causing the mirror plate 104 to have increased voltage (e.g., 32 volts).

Figure 7D:
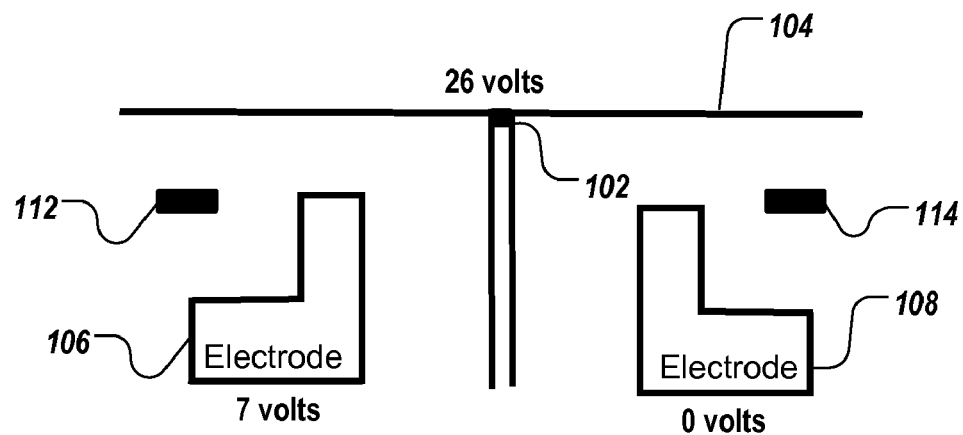

FIG. 7D illustrates the micro-mirror after the reset has ended and while the mirror plate 104 is moving to its final state. The states of the electrodes 106 and 108 are returned to their pre-reset values, and the signal applied to the mirror is also changed to its pre-reset value. The mirror plate 104 has moved into a reset state. For illustrative purposes, the reset state 104 is shown as being a horizontal state; however, other reset states can be used. For example, the mirror plate 104 could move past the horizontal state (e.g., toward electrode 108) during reset.

Figure 7E:
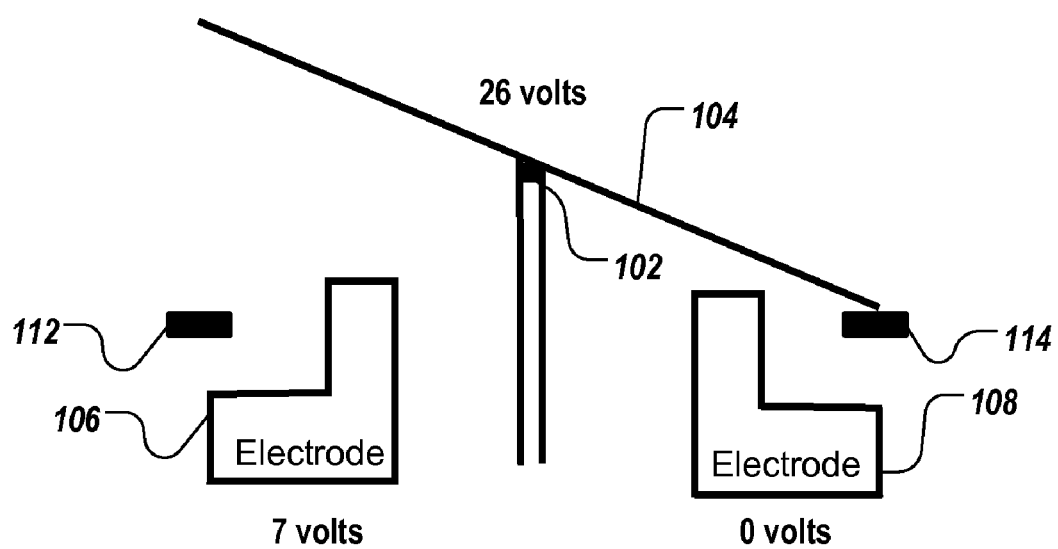

FIG. 7E illustrates a final state of the micro-mirror, after the state of the mirror plate 104 has been updated. Left electrode 106 is in a high state and right electrode 108 is in a low state. This causes mirror plate 104 to tilt to the right.

FIGS. 8A-E illustrate another example stay reset of a micro-mirror using a modified electrode signal. Like the reset described above with reference to FIGS. 6A-6D, the reset illustrated in FIGS. 8A-8E only modifies the state of one electrode during reset.

Figure 8A:
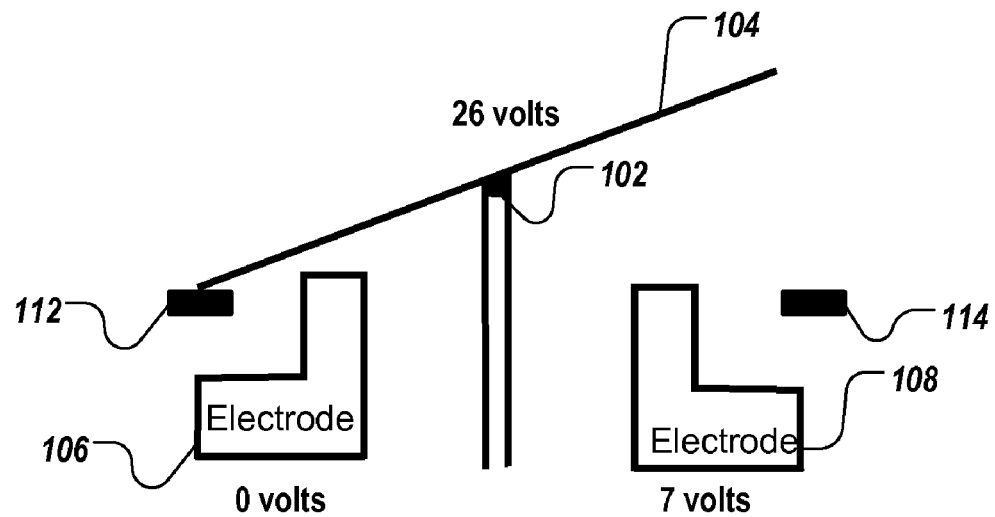
FIGS. 8A-8E illustrate another example stay reset of a micro-mirror using a modified electrode signal.

FIG. 8A illustrates an initial state of the micro-mirror. The left electrode is in a low state (with a corresponding voltage of 0 volts) and the right electrode is in a high state (with a corresponding voltage of 7 volts). The voltage potential differences for the left and right electrodes cause the mirror plate 104 to tilt toward the left electrode 106.

Figure 8B:
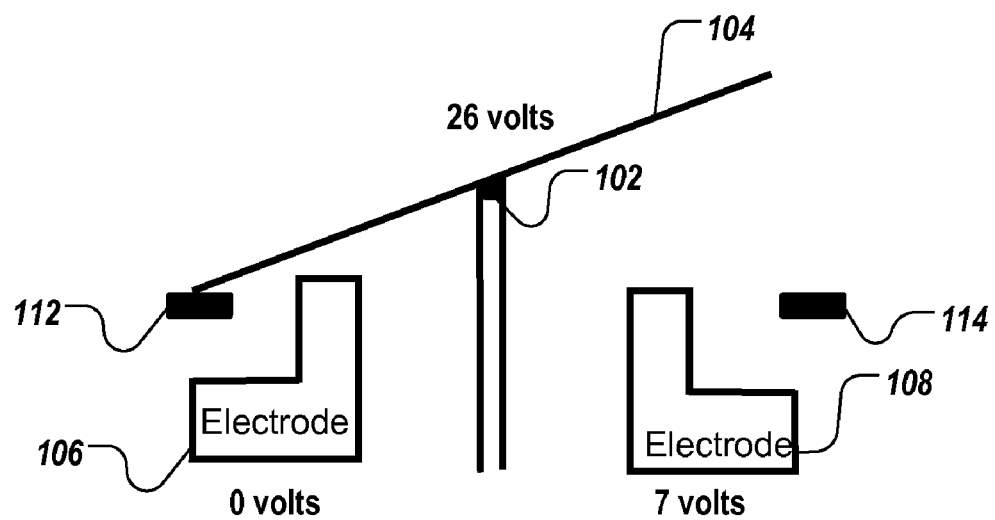

FIG. 8B illustrates a second state of the micro-mirror, after the state of the electrodes has been updated to reflect data stored in memory but before a reset signal has been applied to the mirror plate. The state of the two electrodes is unchanged from the states illustrated in FIG. 8A.

Figure 8C:
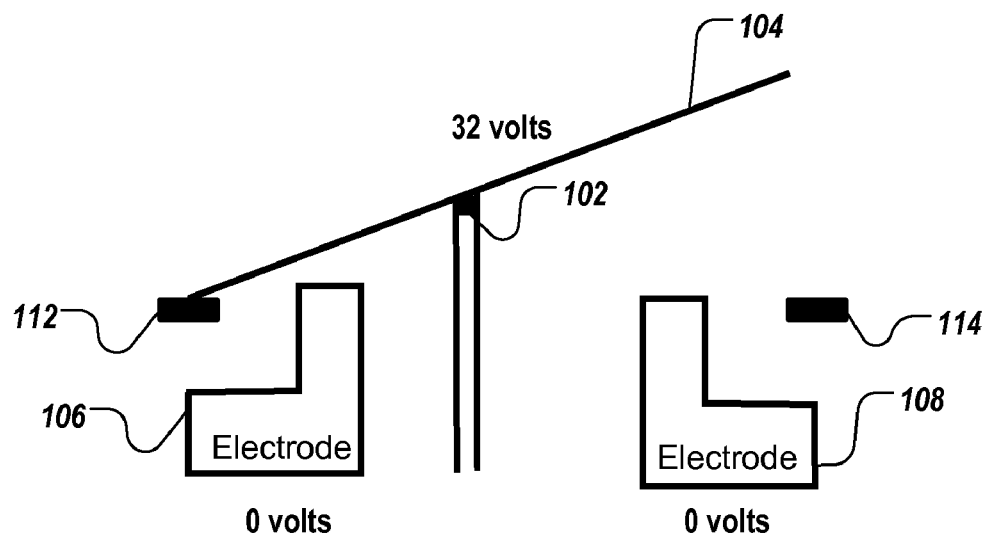

FIG. 8C illustrates the beginning of a reset of the micro-mirror. The state of the right electrode is temporarily modified to be in a low state (with a corresponding voltage of 0 volts). The state of the left electrode is left unchanged. A reset signal (32 volts) is also sent to the mirror plate. This does not increase the downward force on the left spring 112, but does maintain a constant amount of force on the left spring.

Figure 8D:
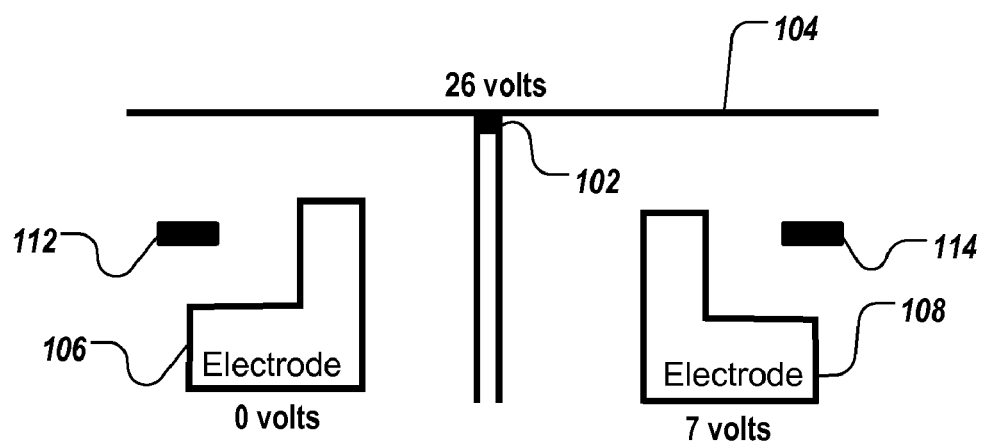
Figure 8E:
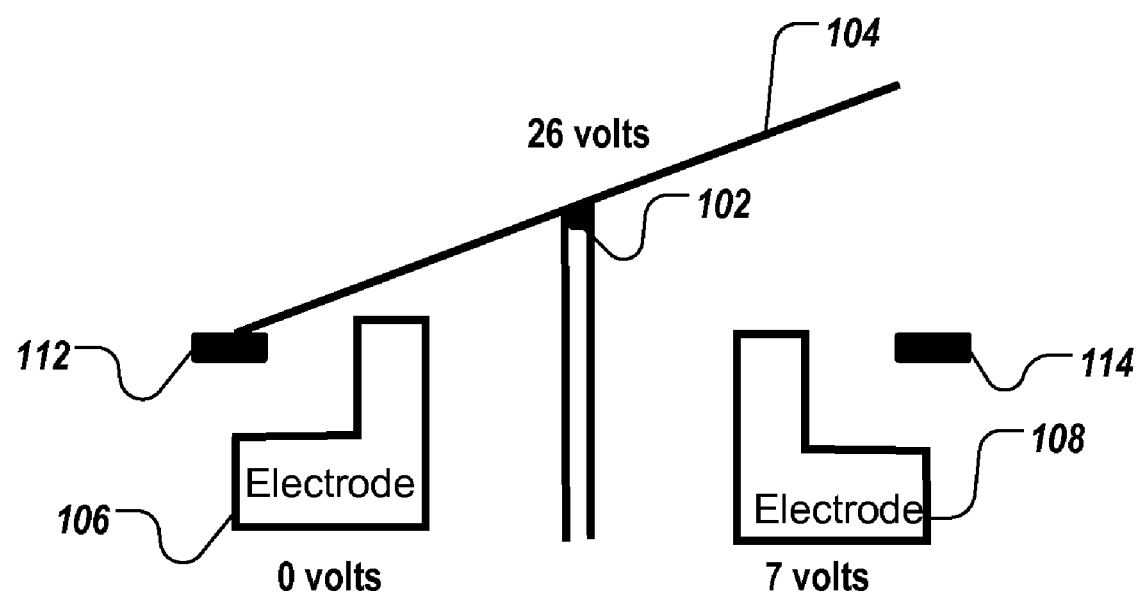

FIG. 8D illustrates the micro mirror after the reset has ended and while the mirror plate 104 is moving to its final state. The voltage on the mirror is decreased to its pre-reset level of 26 volts, and the voltage to the electrodes is returned to their pre-reset values. The mirror plate 104 has moved into a reset state. FIG. 8E illustrates a final state of the micro-mirror, after the state of the mirror plate has been updated. The mirror plate 104 is tilted to the left.

Figure 9:
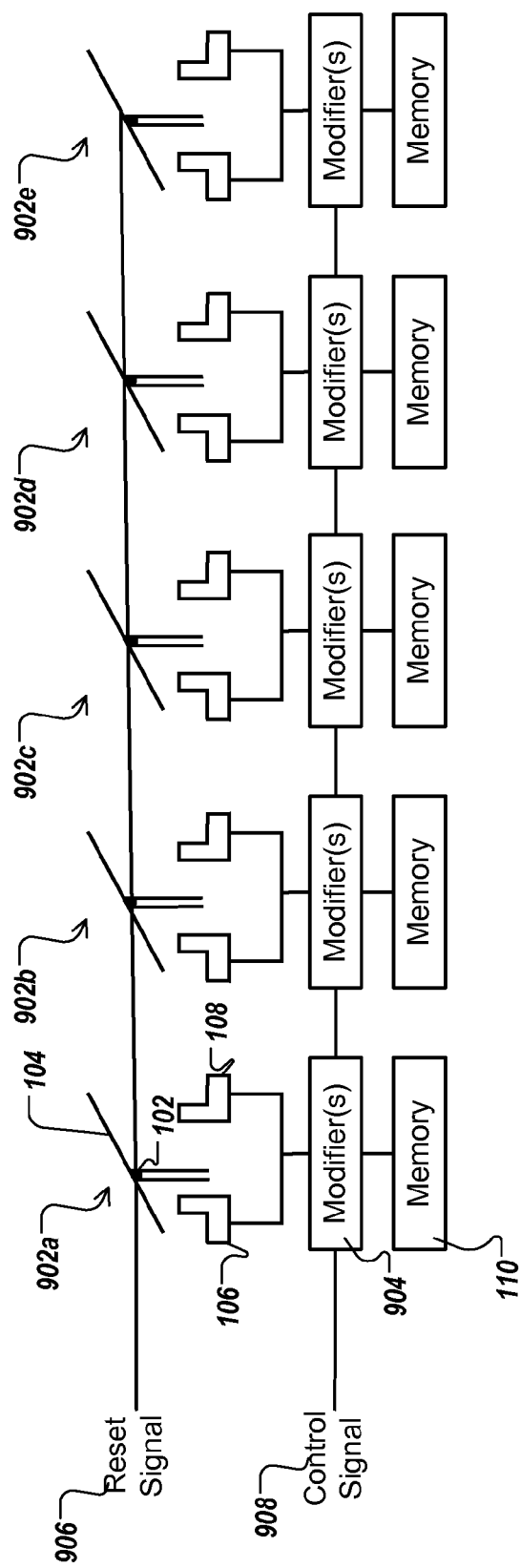
FIG. 9 illustrates an example mirror bank including multiple micro-mirrors that are electrically connected.

FIG. 9 illustrates an example mirror plate bank 900 including multiple micro-mirrors 902a-902e that are electrically connected. Each micro-mirror 902a-902e includes a hinge 102, a mirror plate 104, a left electrode 106, a right electrode 108, a memory 110, and one or more state modifiers 904. Example micro-mirrors are described above with reference to FIG. 1. The mirror bank illustrated in FIG. 9 can be reset using either the techniques described above with reference to FIGS. 2-5 or the techniques described above with reference to FIGS. 7-8.

For illustrative purposes, two signals are shown controlling the reset of the mirror plates. The reset signal 906 controls the voltage applied to the mirror plates 104, and the control signal 908 controls the state modifier(s) 904. The same control signal 908 is illustrated as being provided to each of the state modifiers 904, and the same reset signal 906 is illustrated as being provided to each of the mirror plates 104. This allows each of the micro-mirrors to be reset at approximately the same time. However, in other implementations, smaller groups of mirrors, for example, each horizontal or each vertical line of mirrors, or smaller divisions of mirrors, can be switched at the same time, with a slight offset from other groups of mirrors. This can be done, for example, in order to better satisfy various constraints including power constraints and electromagnetic interference (EMI) constraints. In some implementations, a single control signal is used to control both the voltage applied to the mirror plates 104 and the state modifiers 904, rather than the two separate signals illustrated in FIG. 9.

Figure 10:
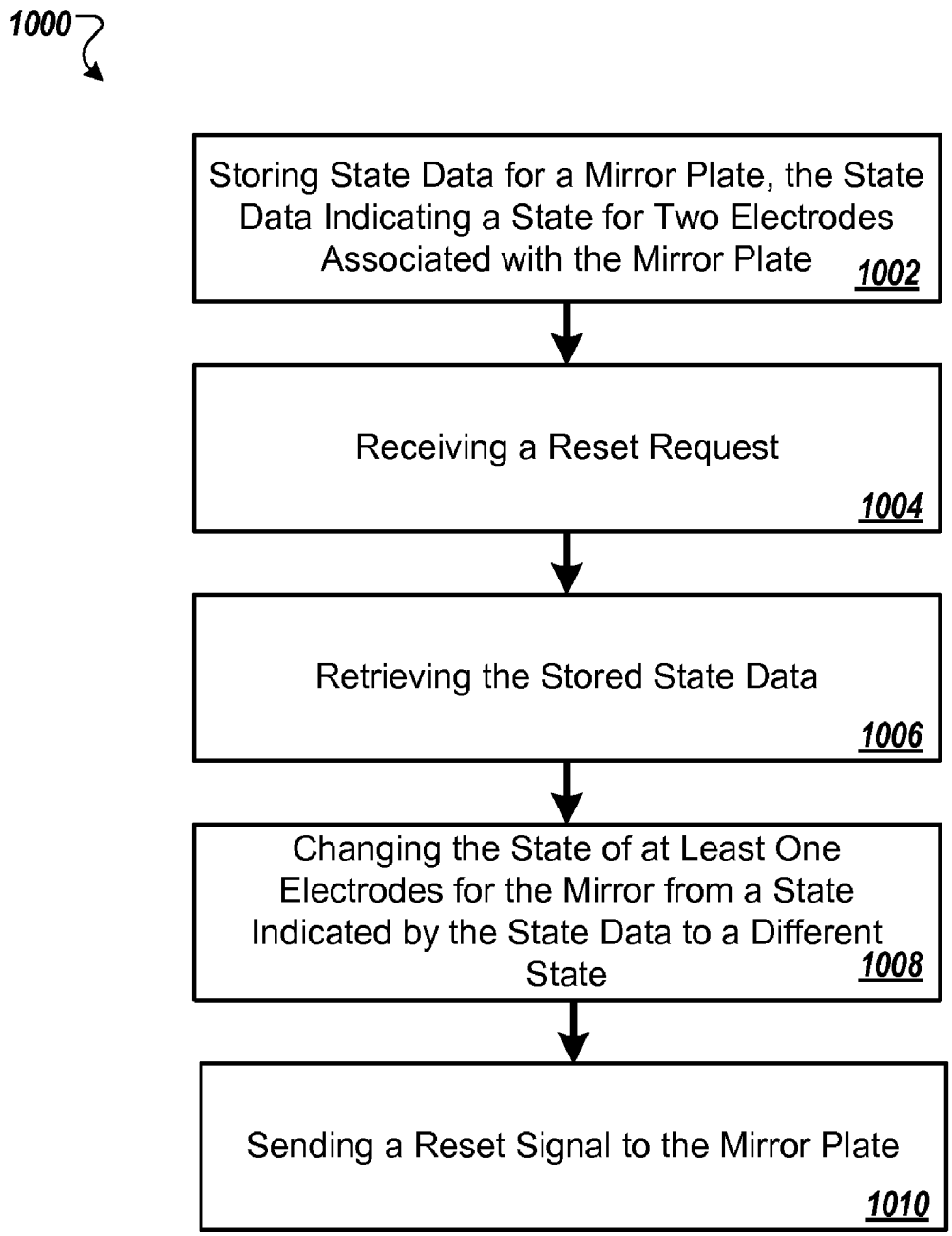
FIG. 10 is a flow chart of an example method for resetting a micro-mirror by changing the state of at least one of the electrodes for the mirror.

FIG. 10 is a flow chart of an example method 1000 for resetting a micro-mirror by changing the state of at least one of the electrodes for the mirror. For convenience, the example method 1000 will be described in reference to a system that performs the method 1000. The system can be, for example, a micro-mirror display system.

The system stores state data for a mirror plate (step 1002). The state data indicates a state for the two electrodes associated with the mirror plate. In some implementations, the state data includes a separate state value for each of the electrodes, for example, as illustrated in FIG. 2.

In other implementations, the state data indicates a single state value for the mirror plate, for example "off" or "on," as illustrated in FIG. 4. In these implementations, the state data for the two electrodes can be derived from the state data for the mirror plate. The state data for the two electrodes is derived so that the states of the electrodes cause the mirror plate to have the desired state. For example, if the mirror plate is in an "off" state when it is tilted to the left in the example illustrated in FIG. 1, then the left electrode can have a low state and the right electrode can have a high state.

The system receives a reset request (step 1004). In response to the reset request, the system resets the mirror plate as follows.

The system retrieves the stored state data (step 1006). For example, the system can retrieve the stored state data by accessing the memory where the state data is stored.

The system changes the state of at least one electrode of the mirror plate from a state indicated by the state data to a different state (step 1008). In some implementations, the system changes electrodes in a high state to a low state and electrodes in a low state to a high state, for example, as described above with reference to FIGS. 2-5. This change can be made by a state modifier that separately modifies the state of each electrode, for example, as described above with reference to FIG. 4. Alternatively, this change can be made by a single state modifier that changes the state of the mirror plate, for example, as described above with reference to FIG. 5.

In other implementations, the system causes the electrodes to have the same state, for example, by only changing electrodes from a high state to a low state as described above with reference to FIGS. 7 and 8.

The system sends a reset signal to the mirror plate (step 1010). In some implementations, the reset signal is a unipolar reset signal. A unipolar reset signal is a signal that has a voltage that is always positive or always negative. In other implementations, the reset signal is a bipolar reset signal. A bipolar reset signal is a reset signal having a voltage, during at least part of the reset signal, that is positive, and a reset signal having a voltage, during at least part of the reset signal, that is negative. In some implementations, the reset signal can be an oscillating sequence of signals that increase in voltage.

In some implementations, the system sends the reset signal to the mirror plate at the same time the states of the electrodes are changed. In other implementations, the system sends the reset signal to the mirror plate at approximately the same time that the states of the electrodes are changed, e.g., within a threshold amount of time of when the states of the electrodes are changed. For example, the system can change the state of the electrodes, then send the reset signal, then change the electrodes back to their original state, and then stop sending the reset signal. The system can alternatively interleave the operations in other ways.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a digital signal processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, including, for example, a digital signal processor. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A micro-mirror device, comprising:
a mirror plate tiltable about a hinge;
two electrodes located on different sides of the hinge, each electrode having two states;
a memory storing states of the electrodes;
a state modifier operable to receive the state of the electrodes from the memory and, during a reset of the mirror plate, change the state of at least one of the electrodes from a state stored in the memory to a different state.

2. The device of claim 1, wherein changing the state of at least one of the electrodes includes changing the state of the at least one electrode from a high state to a low state.

3. The device of claim 2, wherein the high state corresponds to a higher voltage than the low state.

4. The device of claim 1, wherein the state specifies a state of the mirror, from which the state of the electrodes can be derived.

5. The device of claim 4, wherein:
the state modifier is a single state modifier operable to receive the state of the mirror and modify the received state; and
the device further comprises an electrode state determiner operable to receive the modified state of the mirror and determine an appropriate state for one of the electrodes from the modified state.

6. The device of claim 1, wherein the state modifier comprises a separate state modifier for each electrode.

7. The device of claim 1, wherein the state modifier implements an exclusive-or function.

8. The device of claim 1, wherein the state modifier generates a same state for both of the electrodes.

9. The device of claim 8, wherein the same state is a low state.

10. The device of claim 1, further comprising an amplifier configured to provide power to the electrodes according to the states of the electrodes.

11. The device of claim 1, further comprising a reset manager operable to provide a reset signal to the mirror plate during the reset of the mirror plate.

12. The device of claim 11, wherein the reset signal is a unipolar signal.

13. The device of claim 11, wherein the reset signal has an oscillating voltage.

14. The device of claim 11, wherein the reset manager is further operable to provide a reset signal to additional mirror plates that are electrically connected to the mirror plate.

15. A method for resetting a mirror in a micro-mirror device, the method comprising:
storing state data for the mirror on a computer-readable medium, the state data indicating a state for two electrodes associated with the mirror; and
in response to a reset request:
retrieving the state data;
changing the state of at least one of the electrodes from a state indicated by the state data to a different state; and
sending the same, predetermined reset signal to the mirror irrespective of the mirror state.

16. The method of claim 15, wherein changing the state for at least one of the electrodes includes changing the state of the at least one electrode from a high state to a low state.

17. The method of claim 16, wherein the high state corresponds to a higher voltage than the low state.

18. The method of claim 15, wherein the state data specifies a state of the mirror, the method further comprising deriving the state of the electrodes from the state of the mirror.

19. The method of claim 15, wherein changing the state of at least one of the electrodes includes causing both of the electrodes to have a same state.

20. The method of claim 19, wherein the same state is a low state.

21. The method of claim 15, wherein the reset signal is a unipolar signal.

22. The method of claim 21, wherein the reset signal has an oscillating voltage.

23. The method of claim 15, further comprising providing a predetermined reset signal to additional mirror plates that are electrically connected to the mirror plate.

24. The method of claim 15, further comprising, after sending the predetermined reset signal to the mirror, changing the state of the at least one electrode from the different state to the state indicated by the state data.

* * * * *